Patented Nov. 12, 1935

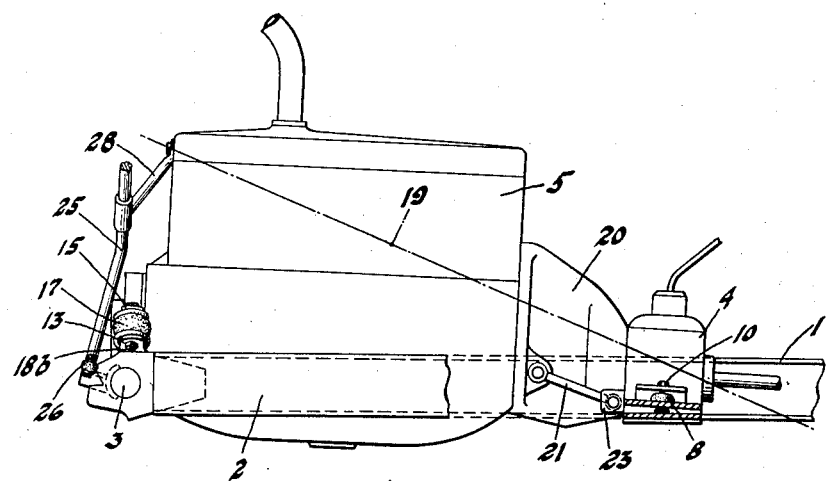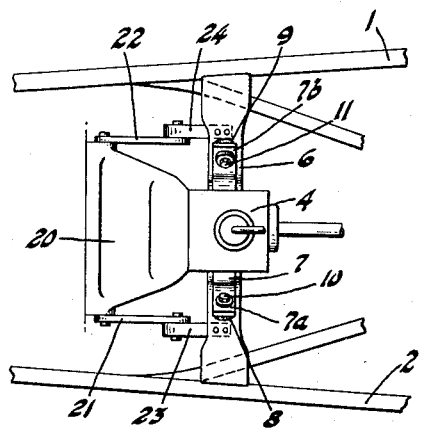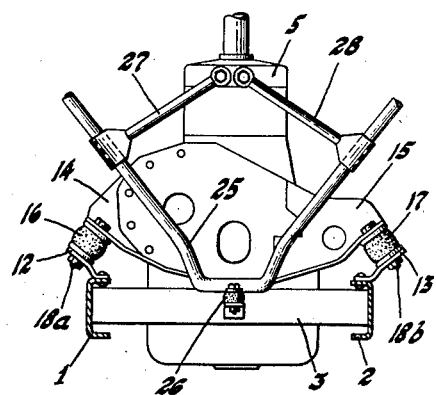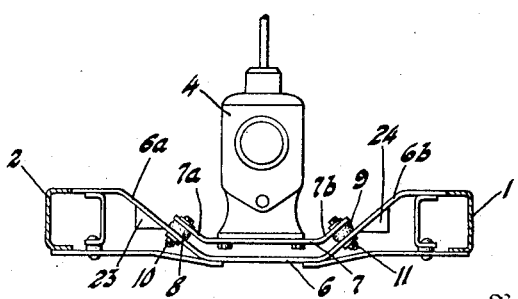

2,020,597

UNITED STATES PATENT OFFICE 2,020,597

ENGINE MOUNTING

Walter D. Appel, Pontiac, Mich., assignor to General Motors Corporation, Detroit, Mich., a corporation of Delaware Application August 13, 1934, Serial No. 739,555
In Germany February 23, 1934

4 Claims. (Cl. 180—64)

It is known in automobiles to mount the engine on the frame in such a way that it can oscillate around an axis passing through the center of gravity or nearly through the center of gravity, and which, starting from a high point of the front end of the engine housing, runs inclined backward. The inclination of the axis is generally determined in such a way that it intersects the driving shaft about the middle of the transmission housing. In the case of a four point suspension of the engine the mounting itself is generally executed in such a way that the engine is mounted elastically at all points on supporting surfaces arranged on both sides of the center line of the car and fastened to the frame, and the slope of these surfaces is dimensioned in such a way that the axis of oscillation is given the desired slope.

In an elastic mounting of the engine at all points in the manner described above, the problem arises of providing special means of preventing longitudinal movements of the engine housing with relation to the frame of the car when the automobile accelerates or slows down, without, on the other hand, preventing the oscillations of the engine around the longitudinal axis. According to the invention this is obtained by the fact that the engine is connected with the frame of the car by means of links, that is, rods, which are placed on both sides of the engine housing and mounted rotatably to the housing as well as to the frame of the car. The drawing shows, as an example, one form of construction of the invention, in which Figure 1 is the engine housing and the arrangement of the links in a side view; Figure 2 is the arrangement of the links in a plan view; Figure 3 is the rear view of the engine mounting, and Figure 4 is the front view of the mounting of the engine.

The frame of the car consists of the side members 1 and 2, which are connected together in front by a cross member 3 and at the location of the transmission housing 4 of the engine 5 by a cross member 6. As a result of the form which has been given to it the cross member 6 forms two inclined surfaces 6a and 6b, which serve for the mounting of the engine. For this purpose a cross member 7 with surfaces 7a and 7b bent upward is fastened below the transmission housing, these bent up surfaces running parallel with the inclined surfaces 6a and 6b. By means of these surfaces the engine housing is fastened by means of the screws 10 and 11 to the surfaces 6a and 6b, with the interposition of the rubber buffers 8 and 9.

For the mounting at the front end, supporting surfaces 12 and 13 are added to the side members 1 and 2, on which are fastened the projections 14 and 15 attached to the engine housing, with the interposition of rubber buffers 16 and 17, also by means of the bolts 18a and 18b. The fastening at both the front and rear ends is effected in such a way that the engine housing is mounted elastically on all sides. Also the inclinations of the rear supporting surfaces 6a and 6b and of the front ones 12 and 13 are selected in such a way that the engine can oscillate around the longitudinal axis 19 shown in Fig. 1. In the present case this axis, starting from the upper front end of the engine, runs inclined backward and intersects the transmission housing approximately in the axis of the same.

As a result of the all around elastic support, in the acceleration and braking of the car there occurs a movement of the engine housing with relation to the frame of the car. In order to prevent this, on the right and left sides of the part 20 of the engine housing are mounted links 21 and 22, which are articulated to the engine housing itself and to the projections 23 and 24, which are fastened to the cross member 6 in any suitable manner. These links extend substantially parallel to the axis 19 and prevent movements of the engine housing in the direction of the longitudinal axis without, on the other hand, interfering with the oscillations of the housing which take place around the axis 19.

It is known to make the fender support in the form of a through supporting beam and to mount it elastically on the front cross member of the car. In that way the torsions to which the frame is subjected, due to the unevennesses of the highway, are prevented from being transmitted to the fenders. On account of the elastic mounting of this support it is necessary moreover to connect it with a point which is not influenced by the torsions of the frame and as far as possible also does not have any longitudinal movement with relation to the frame. In the four point suspension shown, in which, by the use of the links 21 and 22 all longitudinal movement of the engine housing is prevented, the above requirements are fulfilled by the intersection of the axis of oscillation 19 with the front wall. The point thus designated does not, in fact, undergo any oscillations. It can therefore be used for the fastening of the fender support.

In the drawing the fender support is designated by 25. It is mounted elastically on the cross member 3 in a known manner with the interposition of a rubber buffer 26. Also it is connected to the front end of the engine housing by means of two lateral struts 27 and 28, approximately at the point of intersection of the longitudinal axis 19 with this end of the housing.

The inextensible struts may be flexible or pivotally connected at opposite ends to the engine and fender support.

From the above description it will be apparent that oscillations of the engine, accommodated at the points of resilient support, are not imparted to the fender support and frame, and that in the same manner weaving of the side frame members due to road action, occurs without affecting the position of the fender support and engine.

I claim:

1. In combination a supporting structure, an engine mounted on said structure to rock about a longitudinal axis, a fender support also mounted on said structure and a tie connection extending from the fender support and connected to said engine in proximity to said axis of rocking movement.

2. A motor vehicle having a frame, an engine, means movably mounting the engine for rocking movement relative to the frame, a fender supporting structure also movably mounted on the frame and means connecting the fender supporting structure to the engine adjacent the axis about which the engine is free to rock.

3. In a motor vehicle, a chassis frame having a pair of side members and being subjected to weaving action due to irregularities of the road, an engine having a tendency to rock about a longitudinal axis under certain operating conditions, means flexibly mounting the engine in the frame and including a pair of rubber connections located near said side members at adjacent ends of the engine and frame, a fender support movably mounted at a central point on the frame so as to be substantially unaffected by frame weaving and means projecting from the fender support and connecting the engine thereto substantially on the axis of rocking movement of the engine.

4. In a motor vehicle, a chassis frame, an engine flexibly mounted in the frame for oscillation about a longitudinal axis, means to resist relative longitudinal movement between the engine and frame, a fender support flexibly mounted on the frame for relative tilting movement, and positioning means associated with the fender support and connected with the engine adjacent said longitudinal axis of oscillation.

WALTER D. APPEL.